US012003668B1

(12) United States Patent
Yeracaris et al.

(10) Patent No.: US 12,003,668 B1
(45) Date of Patent: Jun. 4, 2024

(54) VIRTUAL ASSISTANT ARCHITECTURE FOR NATURAL LANGUAGE UNDERSTANDING IN A CUSTOMER SERVICE SYSTEM

(71) Applicant: Interactions LLC, Franklin, MA (US)

(72) Inventors: Yoryos Yeracaris, Savannah, GA (US); Michael Johnston, New York, NY (US); Ethan Selfridge, New York, NY (US); Phillip Gray, Cary, NC (US); Patrick Haffner, Atlantic Highlands, NJ (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 17/346,071

(22) Filed: Jun. 11, 2021

Related U.S. Application Data

(62) Division of application No. 16/836,487, filed on Mar. 31, 2020, now Pat. No. 11,606,463.

(51) Int. Cl.
H04M 3/493 (2006.01)
G10L 13/00 (2006.01)
G10L 15/01 (2013.01)
G10L 21/10 (2013.01)
H04M 3/523 (2006.01)
H04M 3/53 (2006.01)

(52) U.S. Cl.
CPC .......... H04M 3/4938 (2013.01); G10L 13/00 (2013.01); G10L 15/01 (2013.01); G10L 21/10 (2013.01); H04M 3/4933 (2013.01); H04M 3/4936 (2013.01); H04M 3/5232 (2013.01); H04M 3/5237 (2013.01); H04M 3/5315 (2013.01); H04M 3/5322 (2013.01); H04M 2203/355 (2013.01)

(58) Field of Classification Search
None
See application file for complete search history.

(56) References Cited

U.S. PATENT DOCUMENTS

| 8,484,031 | B1 | 7/2013 | Yeracaris et al. |
|---|---|---|---|
| 9,245,525 | B2 | 1/2016 | Yeracaris et al. |
| 9,741,347 | B2 | 8/2017 | Yeracaris et al. |
| 10,049,676 | B2 | 8/2018 | Yeracaris et al. |
| 10,096,317 | B2 | 10/2018 | Selfridge et al. |
| 10,216,832 | B2 | 2/2019 | Bangalore et al. |
| 11,288,457 | B1 | 3/2022 | Stoyanchev et al. |
| 2016/0086606 | A1 | 3/2016 | Yeracaris et al. |
| 2020/0120185 | A1* | 4/2020 | Salter ............... H04L 67/51 |

(Continued)

OTHER PUBLICATIONS

United States Office Action, U.S. Appl. No. 16/836,487, dated Jan. 5, 2022, nine pages.

(Continued)

Primary Examiner — Antim G Shah
(74) Attorney, Agent, or Firm — Fenwick & West LLP

(57) ABSTRACT

A virtual assistant system for communicating with customers uses human intelligence to correct any errors in the system AI, while collecting data for machine learning and future improvements for more automation. The system may use a modular design, with separate components for carrying out different system functions and sub-functions, and with frameworks for selecting the component best able to respond to a given customer conversation.

20 Claims, 9 Drawing Sheets

(56) References Cited

U.S. PATENT DOCUMENTS

| | | |
|---|---|---|
| 2020/0227029 A1 | 7/2020 | McConnell |
| 2021/0097140 A1* | 4/2021 | Chatterjee .............. G06N 5/022 |
| 2021/0136206 A1* | 5/2021 | Adibi .................. H04M 3/5175 |
| 2021/0160371 A1* | 5/2021 | McGann ................ G06Q 30/01 |

OTHER PUBLICATIONS

United States Office Action, U.S. Appl. No. 16/836,487, dated Jul. 20, 2021, ten pages.

* cited by examiner

VIRTUAL ASSISTANT ARCHITECTURE FOR NATURAL LANGUAGE UNDERSTANDING IN A CUSTOMER SERVICE SYSTEM

RELATED APPLICATIONS

This application is a divisional of U.S. patent application Publication Ser. No. 16/836,487, filed on Mar. 31, 2020, which is hereby incorporated by reference.

FIELD OF ART

The present invention generally relates to the field of human-computer interactions, and more specifically, to virtual assistants that facilitate human-computer interactions through processing of natural languages and other forms of human expression.

BACKGROUND

Technology and investment in Artificial Intelligence (AI) and its application to customer service has increased in recent years, resulting in much more powerful ways of interacting with the consumers called Virtual Assistants (VAs) (software that interacts with users to respond to needs expressed by the users). Among the leaders in VAs for personal use are Apple's™ Siri™ Amazon's™ Alexa™, Microsoft's™ Cortana™, and Google™. Each of these companies in the VA space has invested substantial resources in Artificial Intelligence (AI). Current systems for virtual assistance in customer care are often completely automated for simple tasks and provide automation support and routing into the appropriate company service representative (agent) to complete more complex consumer inquiries.

Most traditional automated customer care solutions are driven by simple directed dialogs, for example, Interactive Voice Response systems (IVRs). Today's customer care VAs are more complex, where automating customer care systems requires significant investment in highly-skilled technical resources and significant efforts in maintenance. VAs use more sophisticated dialog systems, with open-ended responses, requiring the services of Artificial Intelligence (AI) to automate conversations. Building and maintaining AI systems that learn from data often involves laborious labeling of data by professional annotators and experimentation by skills researchers to produce effective AI models. Testing VAs for customer care requires a significant investment in skilled technical resources. For marketing and legal reasons, companies often require well-scripted dialogs, whether with a live agent or an automated system.

Error management and edge conditions—that is, what to do when the VA does not fully understand the conversation—is one of the major problems for VAs. In such cases, systems have traditionally required extensive "re-prompting", "confirmation", or "clarification" to verify AI understanding, resulting often in frustration for the consumer and subsequent transfers to human agents. Not only does this reduce consumer loyalty, it also incurs more company costs. For companies seeking a high level of customer experience, forcing consumers to adjust to their automated systems can result in lower NSP (Net Promoter Scores) and customer churn.

Emerging systems would benefit from a better understanding of the consumer as obtained from modern demographic and psychographic techniques. Today's conventional systems attempt to match the characteristics of the consumer, and products of interests, with the appropriate agent resources. It would be preferable for systems to have a dynamic understanding of the services provided by AI, so that as the AI becomes more capable the system adjusts appropriately.

SUMMARY

The disclosed system uses human intelligence in real-time to correct the AI of the automated system with deference to system configuration, while collecting data for machine learning and future improvements.

New VAs for customer service will grow increasingly capable through automatic modeling of agent transactions, agent scripting, and agent entry forms. The dialog system driving the VA matches existing application frameworks or templates (generic vertical application frameworks containing logic, business rules, questions/answers, and flow of components) and reusable components to facilitate building and configuring the application. Data is key to machine learning for AI, whether using supervised, semi-supervised, or unsupervised learning. Companies with existing rich data representing consumer conversations are used to teach the AI system. (A conversation is a series of user utterances exchanged with the system that have a related purpose, such as the various questions or statements involved in booking a flight. A conversation contains one or more utterances, each utterance representing a segment of the conversation. For example, in a conversation of a user with a system about checking flight reservations, one user utterance might be 'What is my flight number?')) The new VA captures data from all sources, including voice recordings, text and image transactions, logs, state transitions, or any data that can help AI learn conversations. This system does not distinguish between fully automated, or partially automated, or complete live agent conversations. Any part of the conversation could be automated with or without the consumer's awareness. The goal of a disclosed automated system is combining Artificial Intelligence (AI) and Human Intelligence (HI) to provide a completely seamless virtual assistant, using the appropriate resources in real time when required. What resources are "appropriate" depends on system awareness of various business factors, which include the importance of the consumer, the consumer's area of interest (or service required), the business requirements for the service costs, business requirements for conversation quality, and requirements for security and privacy.

The disclosed system is unique in its combination of a VA with live agents: i.e. using human intelligence (HI) with artificial intelligence (AI) for handling customer service conversations. The disclosed system changes system orientation from automation augmenting a customer service organization (CSO) to viewing all the resources—including automated (Artificial Intelligent) resources and agent (Human Intelligent) resources—as service parts of the system. AI is used whenever appropriate to make customer service seamless and consistent, and to increase automation while reducing customer service costs.

As the AI-based solution obtains data on more company service transactions, the AI-solution becomes more capable. The system uses machine learning to automatically build models and adjust algorithms in order to automate more service transactions. This system is able to adjust to the capabilities of all its automated services, using more AI as it understands more transactions. This understanding is learned from the data produced by observing Human Intelligence (that is, use of humans by the system, such as agents or even crowd sourcing). Testing the new automations can be performed through sufficient comparisons of the new automated transactions to the quality of human results for the same transaction. The testing can be done live (the system has the ability to have two paths in the system: test and live) or by using historical data of human results compared to off-line automated results. When AI achieves the quality required to automate a transaction, the system can dynamically change how this transaction is performed.

Thus, the disclosed system needs to account for all the resources ("workforce") available to the system, which includes automated components and human resources and the requirements of the consumer for a successful conversation. Applications use configurable dialogs to drive the conversations, allowing for customization only when necessary. APIs into company workflow systems and data collected can help the new system define the conversational requirements. Information about the company's workforce, and their capabilities (skills areas of competence), are often described in a workforce system. The disclosed system interacts with existing companies' workforce and Automated Call Distribution (ACD) systems to understand the capabilities of the human resources (agents) and their availability. Any missing information can be added into the system through data entry. APIs into company systems enable the new system to be more dynamic in understanding the agent workforce and tasks required to complete agent entry forms. As the company makes adjustments to their systems, the disclosed system responds. Information about workforce staffing levels, skills, and availability assists the disclosed system in intelligent assignment of tasks to the agents. When agents with appropriate skills are not available, the system then adjusts, increasing the use of less confident AI understanding services, and re-prompting for error rate management. AI understanding services include system services such as speech recognition, natural language understanding, image recognition, and biometrics, as some non-limiting examples. HI understanding services include human agents used within the system, which could include crowd sourcing, or customer agents used to understand parts of or all of a conversation, as some non-limiting examples.

The new system also includes understanding services, including lower cost human resources (called "intent analysts"), who can provide "corrections" (e.g., to transcriptions generated by the AI), as well as selections of intents for the AI understanding services.

The system uses automated conversations to adjust to the requirements of the consumers and their tasks to satisfy their conversation through the use of Advanced Dialog techniques.

Accordingly, the disclosed system provides an AI interface to Human Intelligence (HI), assisting whenever possible, such as providing the n-best results from AI, low confidence elements for correction, and the context of the conversation so far, where the human agent can decide to augment the AI decisions or take over the conversation. Because the new system is data-driven, from machine learning models to configurations, as new algorithms and features are programmed into the system, the new services are available to all the applications in the system.

In different embodiments, the system uses AI solely, HI solely, or a blend of AI and HI, to process the customer service conversation. Metrics for successful conversations—whether AI or HI—are reported and available to the company through APIs. Because privacy has become and will become in the future a more significant business requirement, the disclosed system provides privacy safeguards while agents listen to live conversations with users, such as redaction, or the interception of user utterances and the breaking of the utterances into distinguishable parts and distributing these difficult-to-understand utterance parts to various HI agents for recognition.

DETAILED DESCRIPTION

The system is designed for customer service interactions, which include any business-to-consumer conversation. The customer service industry has a large variety of conversations, from a food ordering use case "I want a large pepperoni pizza," to a large technology company technical support use case "I have a problem with my phone". Consumers communicate to companies through a variety of channels, 105, traditionally through phone calls and SMS, and more recently through what are called social channels, such as Facebook, Instagram, Twitter, Snapchat, WhatsApp, and others. A consumer decides on a device and method of connection. Depending on the device, the conversation can be multimodal and multimedia. As an example of multimodal communication, instead of telling or typing for the system a serial number of a device, the consumer can take a screenshot and send the image of the serial number to the system. The image can be read by an AI Image understanding service 810, which derives the serial number from the image and provides the serial number to the conversation.

New channels, devices, and methods for communication are added into the marketplace all the time. This disclosure will focus on a conversation which can include a variety of channels and modes of communication, but is simplified into the concept of a conversation, which could include a multimodal conversation on a smart device, such as a phone or tablet.

A conversation 103 is initiated by a consumer or the system (e.g., an individual consumer, or by an employee of a company), by connecting a device to the system or connecting to the consumer. This connection could be made by a traditional phone call, mobile call, text message, email, social direct message (DM), a chat session 105, or a social post 160, as non-limiting examples. A conversation 103 is then started.

Figure 9:
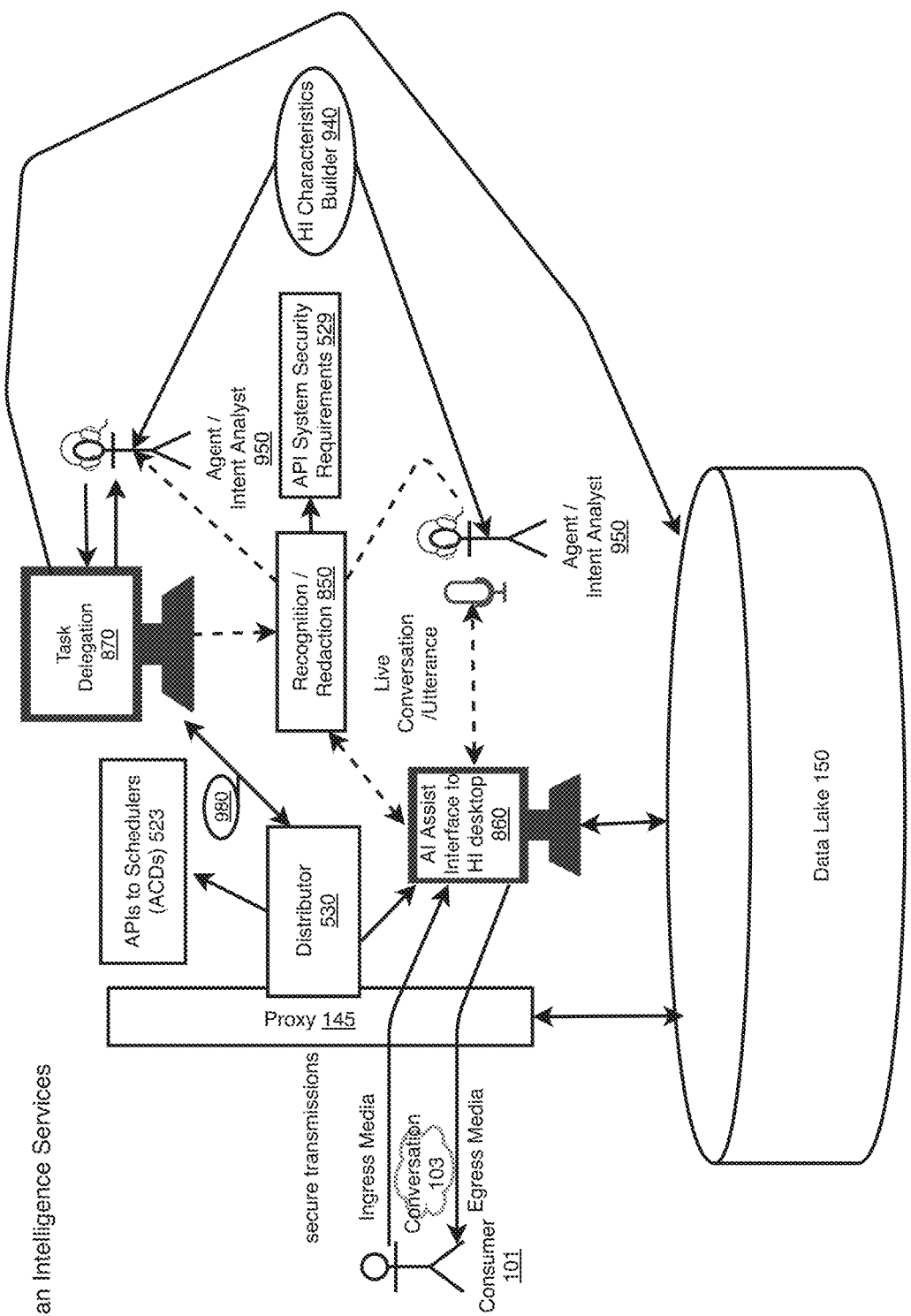
FIG. 9 depicts various types of human intelligence, from help with speech recognition and intent classification; to task delegation; to complex system agent conversations, where the system uses AI to assist as much as possible to help the agent with their efforts, according to some embodiments.

One of the first responses from the system may be to identify the consumer. For example. the consumer may hear or see a system greeting such as, "Welcome to ABC company's virtual agent! What is your name?". Identification of the consumer may use consumer security services 106, biometrics, and/or other means of identification, such as personal information. The user may answer the system by stating his or her name, and the system could use both name biometrics, and name lookup based on the user's provided name, as two factor modes of identification. In the case of textual data (e.g., name) without accompanying biometrics, the dialog 600 may respond with additional questions, which may include passwords or other uniquely identifying information, which the system would encrypt and redact (e.g., item 850 in FIG. 9), if required.

Once the consumer is identified, the system looks up as much information about the consumer as is available through company information 162, through APIs 175, and through consumer databases 177. The system categorizes the characteristics of the consumer by demographics, psychographics, or company priority, as some examples, creating a consumer profile 170, which the system uses to tailor the conversation experience with the consumer. The tailoring of the system experience is governed by company configurations 180 or by system defaults. The system has many configurable parameters, which enables companies to adjust the system to meet business requirements. For example, for a highly-valued consumer, the system could be configured to converse solely with a live special agent, whereas for another consumer the system could use a combination of AI and HI to converse with the consumer.

The conversation is managed by advanced dialog 600, which may proceed to try to understand the purpose of the conversation. For example, the advanced dialog 600 may create dynamic prompting by using NLG (Natural Language Generation) and text-to-speech 107 and media services 108 by asking "How can I help you <first name of consumer>?", where the prompt can include text-to-speech audio and recorded audio.

Figure 2:
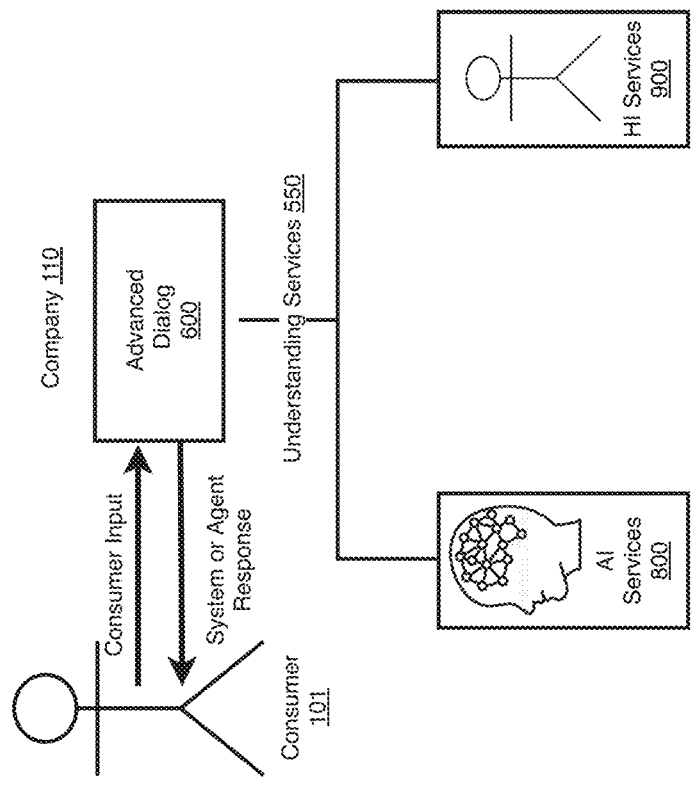
FIG. 2 is a simplified view of the system of FIG. 1, depicting the major components of a conversation, where the system uses both artificial intelligences (AI) and human intelligence (HI) as understanding services, according to some embodiments.

The system in its simplest form can be seen in FIG. 2, in which a consumer interacts with the system, and the system uses a dialog 600 to manage the conversation and uses services 800 and 900 to understand and respond to the consumer (AI services 800, or human interaction 900). The next steps are determined by the dialog 600. In case of asynchronous conversations, such as with a social post, SMS, and chat, the steps can be asynchronous. There may also be asynchronous steps within a synchronous conversation, such as during live voice communication, in which the system may proceed to interpret the next task of the user while also performing an action (e.g., handling payment) corresponding to prior recognized tasks. Asynchronous conversations can require gathering additional information before responding to the consumer. The flow of the conversation could be configured to go directly to an agent (HI services 900), to use automation (AI services 800) only, or to use a combination of both live agent and automation. The consumer may respond in a clear manner, in which case the conversation could be understood by AI 800; if, in contrast, the consumer responds in a way that confuses the AI 800, such as with a long explanation about the problem the consumer is having, the system uses HI 900 to select the meaning (intent) of the conversation.

The system can be configured to use AI 800 only for a specific application or set of tasks, such as those tasks collecting sensitive information, which could result in the system re-prompting and confirming the understanding results with the consumer. The system can be configured to use AI 800 and HI 900 understanding services 550 to minimize consumer time, which improves NPS (Net Promoter Score), and when AI is not "confident", HI can be used to improve understanding.

When configured, at any time that AI services 800 return less than desirable confidence recognition results to the proxy 145, the proxy requests the distributor 500 to use HI services 900 to assist with the understanding of the conversation. When HI 900 is used, AI assist 860 (see FIG. 9) is available to provide help to the agent/intent analyst 950 (see FIG. 9). A custom GUI (or API into existing agent GUI) is presented where the agent/intent analyst can select an understanding response, correct word, enter keywords and have the system search and select the intent based on the correction, to continue the automated conversation. When both AI 800 and HI 900 fail to properly interpret and respond to the conversation, the system may be configured to make live transfers between agents (from an agent who failed to properly interpret the conversation to another agent), or to use error management methods such as directed dialog, or even to use DTMF (Dual Tone-Multi Frequency) in the case of a phone connection.

The system is designed to capture all the data from all parts of the system. The data lake 150 represents a store for all kinds of data. The lake 150 can consist of conversation data, "consumer inputs into the system", and "responses system outputs to the consumer" (which can be live conversations), recordings, recording transcriptions, text, images, and logs, events, error messages, biometrics, AI data, models, model revisions, revisions of the dialog, HI data, HI quality data, consumer data, consumer profile data, company history data, knowledge-bases data, distributor data, and dialog state data, as just some examples.

The system tries to maximize the quality of the data it stores. The system distinguishes data that is obtained from AI 800 from data that is obtained from HI 900. Without this distinction, AI 800 would train on AI data, which can be reinforced with AI models, reducing important edge conditions (i.e. AI doesn't understand what it doesn't understand). Data is organized by the system for tasks that the system performs. The system uses success metrics, such as time to perform the same tasks across all understanding services 550, or the number of conversational turns to perform the same tasks, as examples of quality metrics. Quality metrics are used by machine learning to weight HI data for either supervised or unsupervised learning.

Most conventional AI systems require well-structured and well-labeled data provided by professionals to ensure the accuracy of data for machine learning. The system is designed in a way to maximize the use of all HI data, which in some embodiments uses a form of crowdsourcing of its HI, in off-peak hours, by sending the same conversation to multiple agents 950, using a clear majority of results as weighted data for machine learning. This technique can virtually eliminate the need for professional data labelers.

Figure 3:
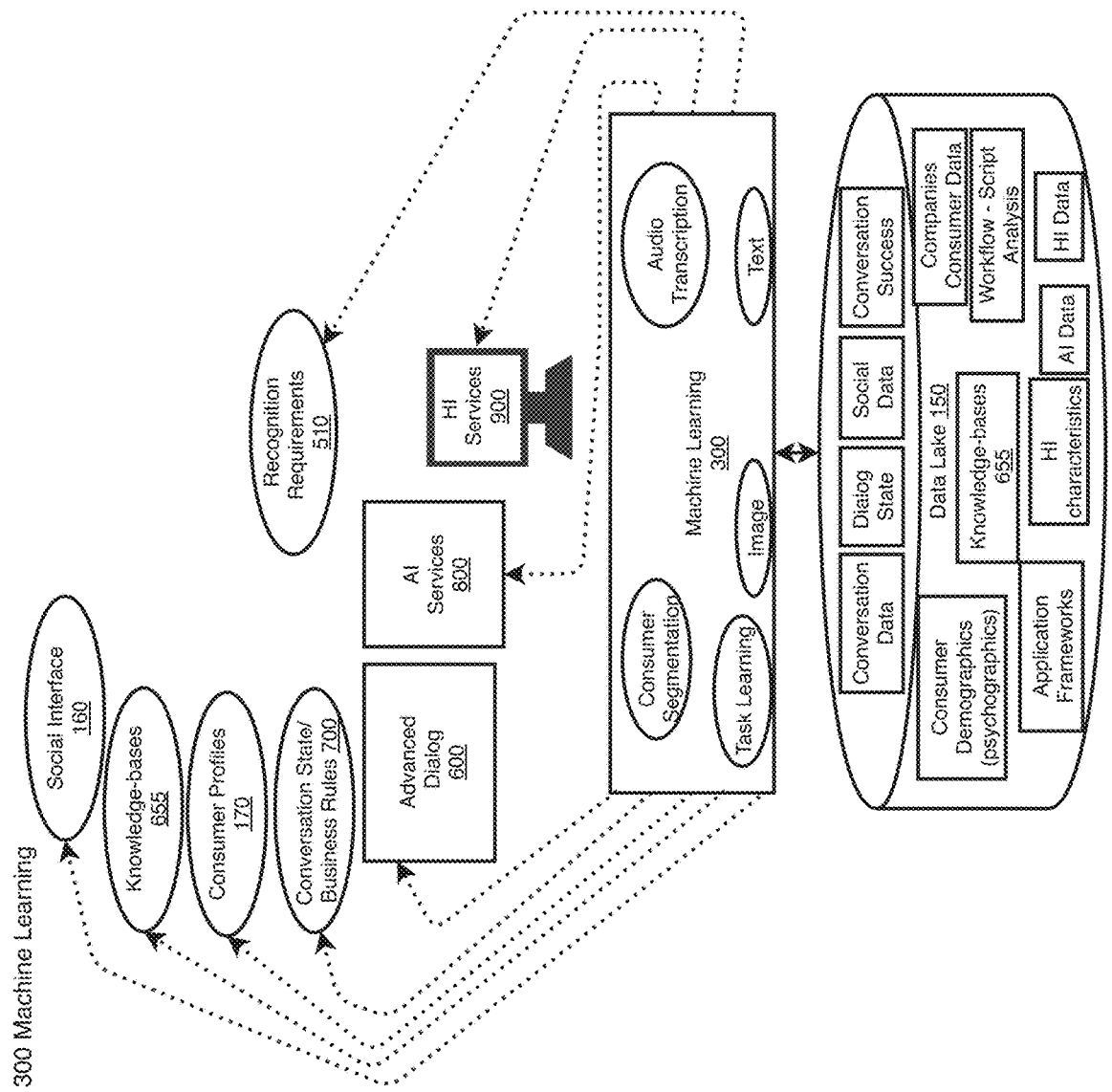
FIG. 3 illustrates examples of the data and machine learning processes, as well as some of the system functions that require model updates for ongoing system improvements, according to some embodiments.

In FIG. 3, machine learning 300—which is made up of multiple learning processes—uses data in the data lake 150 to produce models and update algorithms for various parts of the system The data lake 150 is made internally consistent, both in semantics, ontology, and syntax, by use of the data map 180, to interface to company data 162, 164, 166, 523, 526, 529. The data map 180 enables a company to continue to use its own data semantics and name syntax, while mapping its data and data names into standard well-organized system data. For example, Hilton™ has a rewards program "Hilton Honors", and Marriott™ has a program called "Marriott-organized system data." These can both be mapped to a generic "Hospitality Rewards", which can cover hotels, cruises, etc. This enables the system to understand the semantics of customer data. The standard system data is organized in a manner to reflect most industry organization. In some embodiments, the data map 180 has standard interfaces to company agent desktop software such as ZenDesk™, Oracle™, and Salesforce™, as some examples. Included in the data map 180 are validation criteria methods to interface to company data for validation. The data map 180 has the ability to be customized by a company, with the system default organization as a starting point. When the unique data of the company is added into the map, semantic grouping of the data is done by the company. Most customer service conversations have data fill requirements. For example, in an airline reservation, the dialog may require the departure date, departure time, source city, and destination city. The data that is entered into agent data entry forms 860, the scripting language that is used by the agents 950, and the transcription of consumer and HI live conversations, are mapped 180 into the Data Lake, which is used by machine learning 300 to understand the sounds, words, and their associated flows. Tasks that remain to be executed, and that are not within the set of tasks for which the system currently has sufficiently accurate AI equivalents, can be delegated to the customer's human agent or robotic process automation (RPA) bot. A general API can be built to interface with the customer, with information about the specific task to be performed being sent in the API; the specific task being performed by an agent; and the results being returned back to the system. In some embodiments, the agents themselves are defined within the system, and the distributor 500 can assign the delegated task to a specific agent. In another embodiment, tasks could be scheduled in the distributor 500 and sent via the API to request the customer agents to perform the task for the conversation. For example, a task could be "enroll new customer and address for the new customer" to handle to the data entry, since there is no interface for the AI to enter a new customer. The type of task (namely, new customer entry) could be sent to the customer system and the customer system could assign the task to an agent based at least in part on the task type, and the system via the API sends the data it collected to the agent, who could enter and edit the data into the customer system, returning to the system information like the account number and a status of the task.

Since the system is mostly data-driven, new techniques, functions, and algorithms can be programmed into the system, while maintaining backward compatibility. New functionality may require new system configurations.

AI Services 800, 810, 820, 830, 840, 850, require model building using machine learning 300. Algorithms used for model building can include deep neural networks and/or other model types to produce acoustic, word, intent (classification), and confidence models. The system also produces models that are used by the advanced dialog 600 models for the HI assists 860, 870 of FIG. 9, which help agents by producing a custom GUI or interface, for intent selections from n-best results from AI, or helping agents to perform searches into knowledge bases, using keyword searches for intent selection, for direct HI entry 950.

As the advanced dialog 600 learns more capabilities, the tasks that the dialog 600 can successfully perform are added as capabilities of the AI system. For example, assume that a consumer wishes to make a hotel reservation. The type of the consumer influences the dialog requirements 520, as do the associated tasks 420 (see FIG. 4). Each task has form fill requirements, like a hotel property name, which would include AI search for the property 655, reservation dates, number of rooms, etc. The consumer profile 170 is used by the distributor 500, as dialog requirements 510. The Distributor 500 analyzes the available AI services 800. For example, departure date and time entry might be functions that are within the capability of the advanced dialog 600, so the distributor 500 can assign the determination of departure date and/or time entry to AI.

Dialog requirements can vary by consumer. For example, a platinum level consumer (a highly-valued consumer), may be connected by the distributor 530 to a live agent 950. If by chance there is a large queue for these specialized agents, the distributor 530 could use a dialog asking if the consumer would like to be scheduled for a return contact by the specialized agent or to proceed with the automated system. In contrast, the distributor 530 could send a less valued consumer to the AI virtual assistant. Such decisions may be specified by a policy (e.g., that consumers with certain attributes—such as platinum level status—are to be handled by HI, and other consumers with other attributes are to be handled by AI); such policies may be consulted by the distributor 530 when determining whether to use AI or HI for a given conversation or portion thereof.

Figure 6:
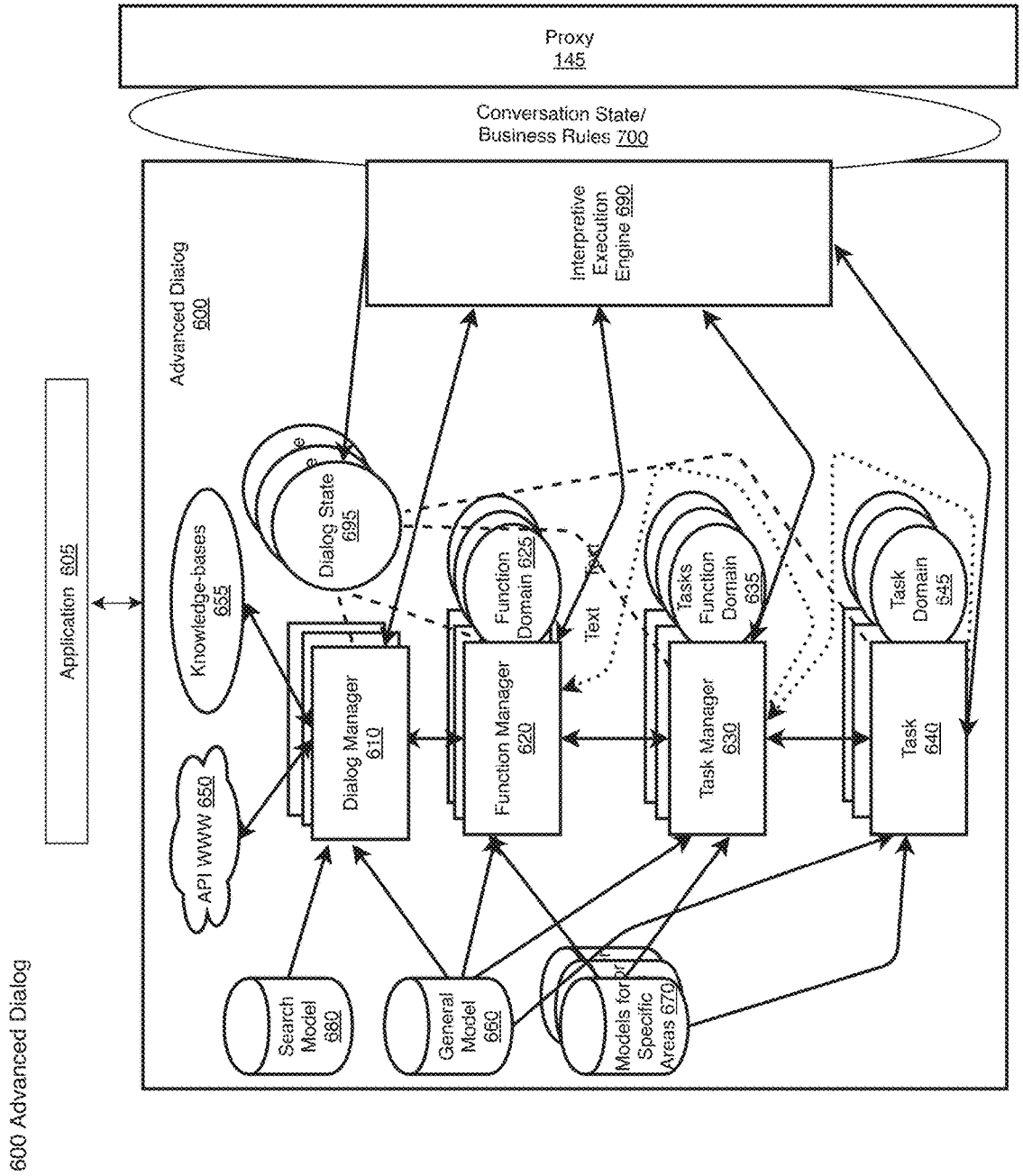
FIG. 6 is an example of advanced dialog that can learn over time how to successfully perform more services required by the system, using data and machine learning to transform HI (agent conversations) into AI services, according to some embodiments.
Figure 7:
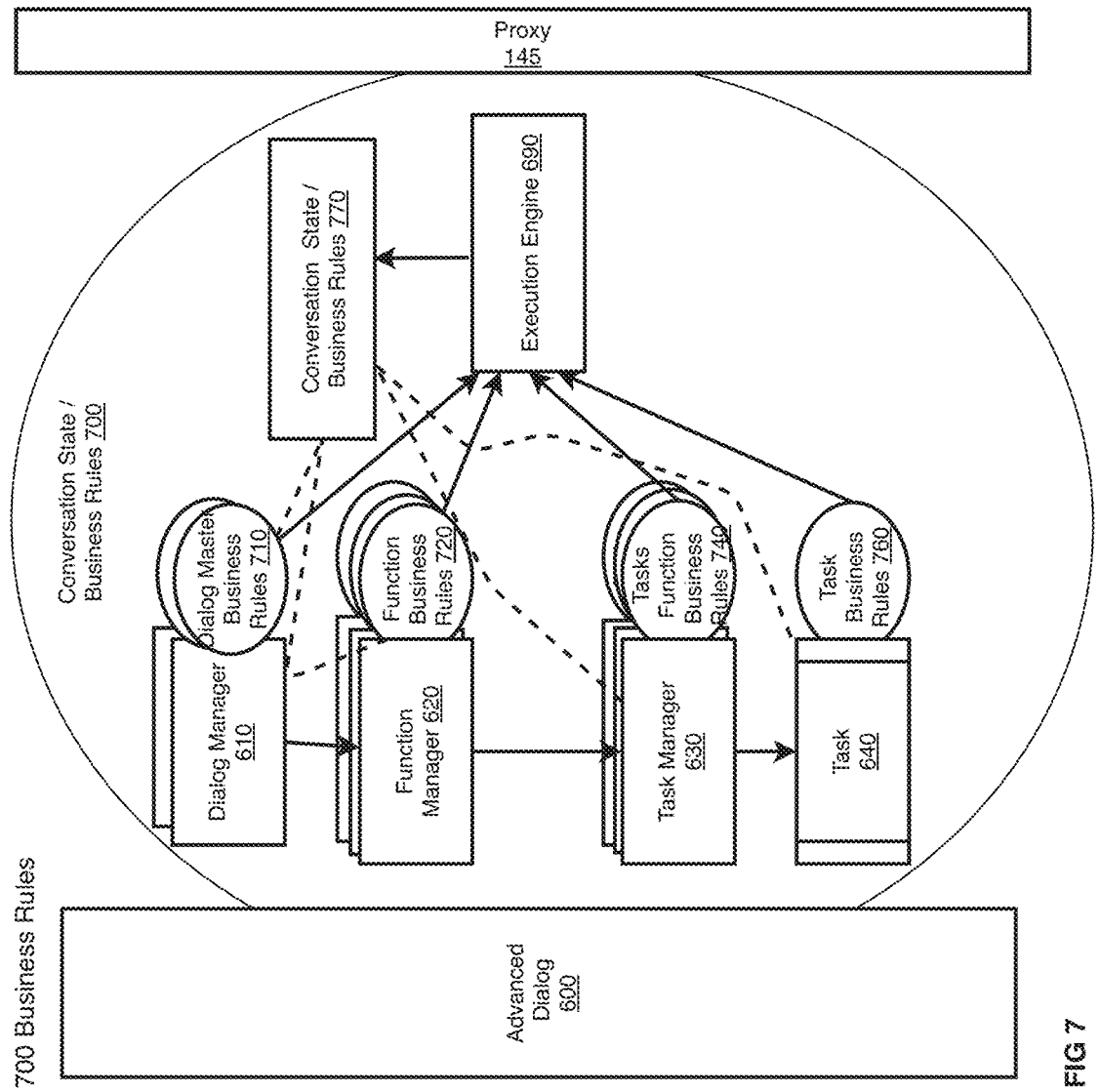
FIG. 7 depicts an example of business rules and their domains, where the business rules execute and influence the next steps in the conversation with the consumer, according to some embodiments.
Figure 8:
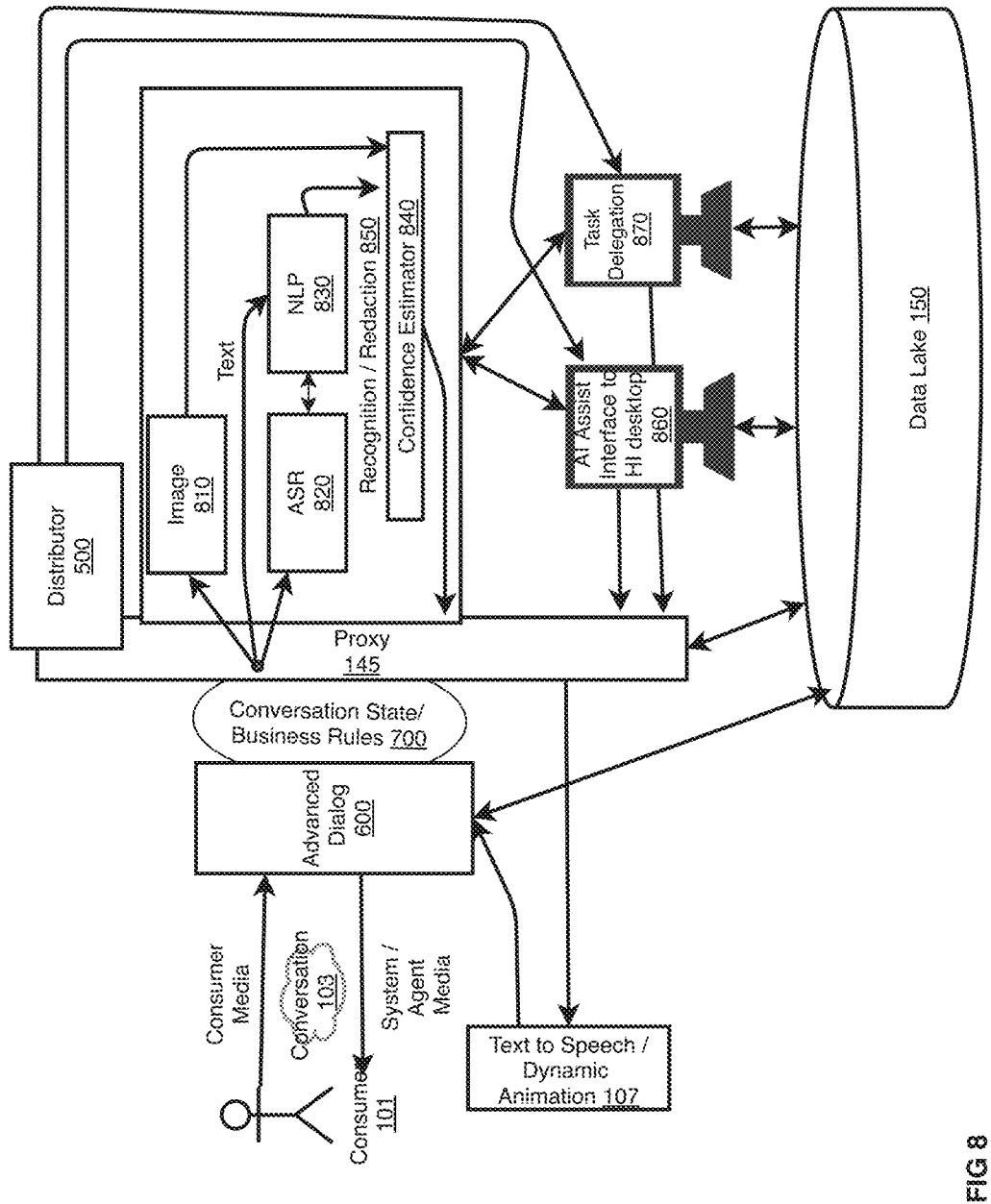
FIG. 8 depicts an example of the various AI components of the system, including multi-modal, multi-channel understanding services, such as image, voice (ASR), text (NLP), including a security feature (redaction) for live conversations with agents, according to some embodiments.

FIG. 6 is a representative example of an advanced dialog 600, as represented by a network of many nodes (610, 620, 630, 640) and many hierarchies of specialty. Models can be built by machine learning 300 as general models or specific models, as represented in models 660, 670, and 680 in FIG. 6.

There are two main operations of the advanced dialog 600: i) configuration of the dialog nodes, and ii) execution of the dialog by the interpretive execution engine 690. The advanced dialog system 600 is interpretive and is executed by predefined configurable components. Being interpretive enables the system to change in real time by changing configurations or adding instructions to the execution engine 690. The system also is configured to be able to run tests, with a layering of environments from development to test to company test to trial production to live production. The execution engine 690 can have company-specific application code added into the system, which provides flexibility to the system for tailoring to company requirements. The execution engine 690 not only executes the dialog but also executes APIs and custom APIs with the data map, which enables communication with a company's systems, fires off business rules 770, and adjusts the application dialog state 695.

When execution of a dialog component is completed and the business rules 700 are satisfied, the advanced dialog 600 updates the state 695 of the dialog, determines the next step in execution (and possibly executes another prompt to obtain additional needed information, if any), and then supplies the distributor 530 with dialog requirements for an understanding service.

The advanced dialog 600 enables connections to the internet to perform searches or to interface with VAs to search for information and to communicate with other VAs, such as Siri™ Alexa™, Cortana™, or Google™. The advanced dialog 600 has the ability to find answers and search a company's knowledge-base.

The advanced dialog 600 need not have a predefined sequence of execution. It has a starting point, but allows navigation to the consumer conversation to fulfill the consumer's requests. The sequence is determined by the path the consumer wants to traverse to accomplish the consumer's goals. Any dialog component, or node thereof, can be executed at any time. The dialog state 695 tracks the execution requirements of each of the nodes, 610, 620, 630, 640. For example, payment information for a hotel reservation may be incomplete and the conversation accordingly may be suspended, since the consumer requires the system to look up the consumer's bank account number via the internet. Then the consumer may want to know the consumer's checking account balance and to transfer money from savings, prior to completion of the electronic payment from the consumer's checking account.

In some embodiments, as is discussed in more detail later below, the advanced dialog 600 is a dialog system, such as (for example) a propose-decide framework, where the dialog manager 610 and Understanding Services results from the proxy 145, polls each of the dialog components, 640, 630, 620, to decide which component can provide the best answer or interpretation to the current conversation.

Dialog tasks 640 can include one or more tasks, and a dialog task in turn is managed by a task manager 630. For example, the task manager 630 could represent the process of paying by credit card. In this case, the tasks 640 could be to collect credit card number, expiry date, or security code. When the consumer is asked for choice of payment type (e.g., "how do you want to pay for . . . "), the consumer may answer "by credit card". The Function Manager 620 for "payment" may manage the task managers 630 for all sorts of payment options, such as a check, credit card, PayPal™, Rewards, etc., assigning the work to the "credit card payment" task manager to perform credit card payments.

Another unique aspect of this system is its ability to test "success" by comparing results from dialog automation to HI performance. The recognition/redaction component 850 of AI services 800 transcribes the conversation between the agent 950 and the consumer 101. In some embodiments, the script and workflow analysis 410 of the system compares results of tasks performed by agents 950 with the same tasks performed by the advanced dialog 600. In some embodiments, testing is automated by the system acting as the consumer during conversations associated with the tasks 640, and comparing AI to HI results in the data lake 150, for the same tasks. When the automation obtains a configured success threshold, which can be measure as the percent successful AI performance of the tasks, vs HI task performance, these tasks 640 are added into the capabilities of the advanced dialog 600 and can be assigned by the distributor 500. This threshold could be calculated automatically by the system, where the system weighs the goals of support costs vs. consumer time, and determines that 90% of HI success is an acceptable threshold, and/or could be added into the system in 185.

The dialog manager 610 can represent a network of dialogs (or applications). Business rules 700 are entered as scripts into the system and can be interpretable scripts in scripting languages such as JavaScript, or Python, or executable code such as native operating system binaries, byte-codes for a virtual machine, or the like. Business rules are executed whenever dialog state changes. As one example of a business rule for payment, a rule could require a credit card expiration date to be more than 1 year in the future. Such a rule would not make sense as data entry validation, which would be part of credit card expiry date entry. Business rules 700 may be defined at any "node" 610, 620, 630, 640 of the advanced dialog. The business rules 720, 740, 760 execute when the dialog logic completes within an execution step of the dialog node. If the dialog logic is if not satisfied, the advanced dialog 600 is programed to manage the error.

AI Services 800 include services such as understanding services like image processing 810, (facial, iris, drawings, signs, maps, photographs, drawings, hand gestures, etc.), ASR (Automated Speech Recognition) 820, and NLP (Natural Language Processing) 830. Some of the specialized capabilities of the systems for ASR and NLP is described in U.S. Pat. Nos. 10,096,317 and 10,216,832 are incorporated herein by reference. One unique capability of the system is the proxy 145, as described in U.S. Pat. Nos. 8,484,031; 6,025,785; 9,245,525; 9,741,347; and 10,049,676. The proxy 145 analyzes information about the consumer, current conversation, and conversation history, accordingly updates dialog requirements 510. The proxy 145 can evaluate the results from AI.

HI services 900 provide a spectrum of human understanding services, ranging from simple word corrections in voice to more complex technical issues. Recognition/redaction component 850 is configured to run on live conversation, or on recorded conversations, transcribing and monitoring conversations for: i) Identification of functions and tasks that automation could provide, where the system, if configured to do so, can transition from a live conversation to an automated conversation, can delegate tasks 870 to Agents/Intent Analysts, and ii) Identification of SPI (Sensitive Personal Information) within conversations between an agent 950, and the consumer 101.

The system can identify when an agent (HI) 950 is receiving personal information within the media stream. Such SPI can be redacted from the conversation by the recognition/redaction component 850, and processed by the system so as to ensure that privacy is maintained. The system may also distribute the conversation to different agents 950 as separate portions, such that the SPI cannot be obtained by any one agent. For example, a credit card number can be broken up into several utterances (e.g., the credit identification number, and two sets of four digits, the expiry date, and the security code) and distributed to different agents 950. Alternatively, if the agent 950 had the appropriate security clearance, redaction would not be necessary.

The agent desktop is equipped with an AI assist user interface 860, in which the agent selects the intents proposed by AI or types in or otherwise inputs text to select intents. Other agents 950 could be trained to enter data for specific tasks (an example of task delegation 870) to complete tasks for the conversation. Certain agents 950 may be configured with the ability to enter freeform information. This freeform information would cause the automated system to connect directly with the agent 950. The Agent desktop 870 can also be configured to receive tasks, such as name and address entry, either asynchronously (where the system would continue with the conversation with the user) or synchronously, where the user would wait for the task to be completed. In some embodiments, a general abstract web service API is used for task delegation, minimizing the need for a direct API and connection with the system. AI assist for the agent can be combined with the agent desktop 870. The conversation with the task could be recorded and the audio sent, if necessary, or the system could fill the required data and send it to the agent for entry into the customer system. The proxy 145 uses the distributor 530 to request HI for interpretation of a conversation with a consumer when AI understanding services 800 does not have sufficient confidence, and/or does not have an intent that meets the conversational requirements configured in the system (e.g., the current conversation is at a state in which the user is expected to provide product information, yet AI 800 determines that the user appears to be expressing an intent to speak with a customer service representative).

The data provided by HI 900 becomes valuable training data for the machine learning 300. The system also tracks the agent 950, using analytics and metrics to assess and quantify agent quality. Quality of agent performance enables the machine learning 300 to weight the data for building better models. This agent quality metric could be associated with the agent from external systems such as Avaya™, Genesys™, Zendesk™, Nice™, and CallMiner™. Measurements of agent quality can be obtained by comparing the effort and time an agent takes to perform certain tasks to the effort and time that other agents take. The system understands how to perform "gold standard" transactions. A new agent, or existing agents, are asked to perform these transactions by sending text, media, or recorded consumer conversations for specific tasks to the agent. The results of these transactions are then graded as a quality metric. Agent voice quality is analyzed and used as one of the characteristics of the agent. Other indications of agent quality can be obtained through surveys. The agent quality metric and characteristics can be used by the distributor 530 as part of the capability of HI 900.

Given a sufficient amount of data such as tasks performed by all agents 950, transcribed conversations, agent quality grades, and data entered by the agent (successful transactions), machine learning 300 can use that data to generate better models and thus improve AI in the system.

Figure 4:
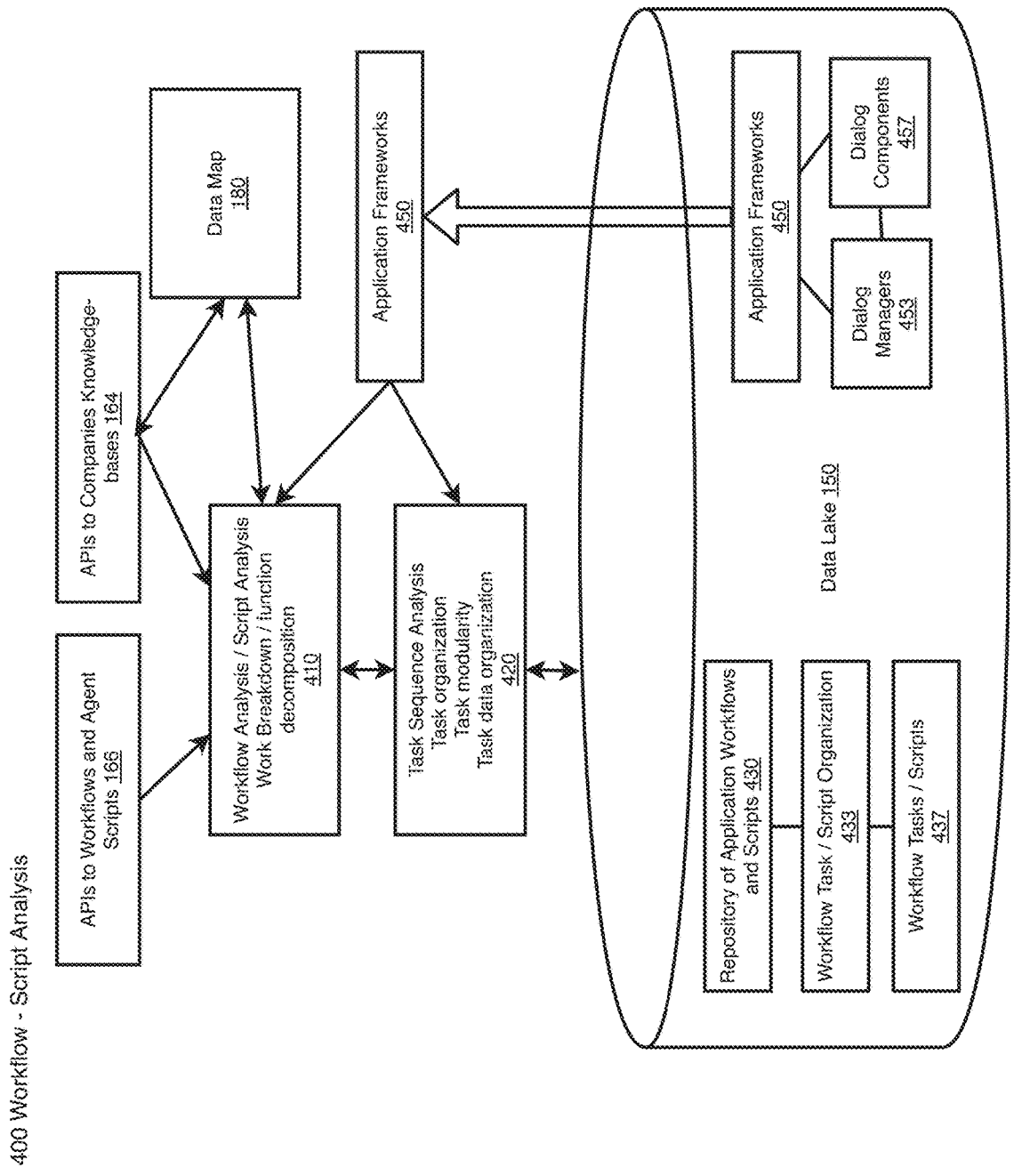
FIG. 4 depicts an example in which agent workflow and scripts are analyzed and organized into tasks and matched to application frameworks and dialog components, according to some embodiments.
Figure 5:
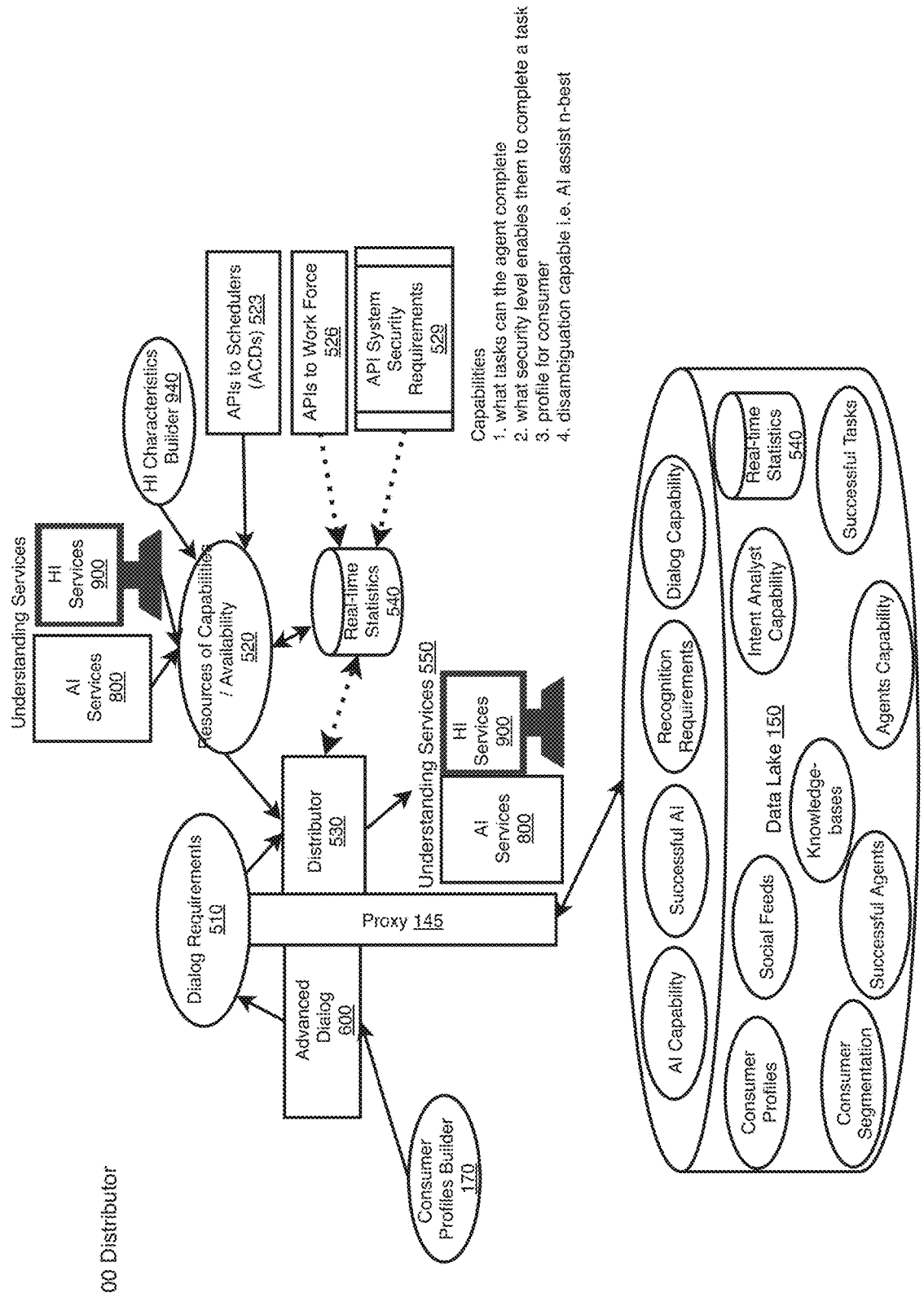
FIG. 5 depicts an example of work distribution to the appropriate system components depending on the conversation requirements, consumer characteristics, and the capabilities and characteristics of the understanding services, according to some embodiments.

In FIG. 4, the application frameworks 450 consist of executable components which are configurable and designed to execute typical company applications, such as reservations, tech support, collections, or banking as some nonlimiting examples. The application frameworks 450 are executable code that is in a form that requires configuration data in order to execute. The configuration data could be automatically configured by Workflow Analysis/Script Analysis 410, acquired by APIs to Workflows and Agent Script 166. The Agent Scripts can provide the questions and the data required in a conversation, which in turn is matched by AI or a data entry person, to the tasks 420 of the Dialog Components 457. For example, assume the following reservation conversation between an agent and a consumer:

Consumer: Hello

Agent: Afternoon and welcome to Hyatt Rewards. May I have your phone number or your rewards number, since we don't seem to match your telephone number in our system?

Consumer: Yeah, I am calling from my work. My number is 555-555-5555. Also you can add my work number into the system, which is 222-222-2222.

By analyzing 410 the script, the system can decompose the script into several components:

(1) Task: system greeting, using configuration data
(2) Task: collect consumer identification
   A. Collect phone number
   B. Collect reward number
(3) Task Collect Phone Number to search
(4) Task Collect Alternate Phone Number which also uses (3).

By breaking down the agent conversation, these tasks may be added into the tasks 640 that AI performs, since the task is already understood by the AI system, in a dialog component 457, to enter a phone number. The system may also have an API to the customer system that enables it to post data it collects or learns to collect to the customer system.

An example of configuration data can be as simple as defining the company name, where the first prompt of the system may be composed of code that supports prompting for literal text, followed by any amount of variable data items, followed by more literal text. For instance, the prompt may be "welcome to"+<ABC Company>+"how can I help you?", where <ABC Company> represents a variable data item that may be filled with a company name. If a dialog component lacks the required data to execute (e.g., it lacks a value for <ABC Company>), the system can use HI to converse with the consumer while collecting data to configure the task 640. The matching is done through understanding the workflow of the scripts, their options, data that is collected by the agent, collection logs with time stamps, etc. For example, if there is no script which allows for both searching for rewards by phone number and adding an alternate number into the system, the system knows the agent steps: (1) the data that was collected, using "search" for rewards by phone number, then step (2) data collection of the alternate phone number, these two tasks, which the agent performed were manually entered, as part of the agent script, entering the alternate phone number.

The data map 180 maps data from company syntax and semantics to system syntax and semantics. The data that is collected in the workflow forms 420 is mapped into the system data and forms, which enables the system to match application frameworks to the company workflow.

The system workflow is represented and displayed to the company in a GUI 185 using company syntax and semantics. The company can select application frameworks 450 that best represent the company's industry and customer care applications. This selection allows the system to match the company's applications. The company configures, customizes, and adjusts the standard dialog components 457 and business rules 700, and adds dialog components if required. The company has the ability to build new application frameworks. Dialog components can be overridden or augmented by the company. The system enables on-going adjustments and additions to application frameworks 450, dialog managers 453, and dialog components, 457, (parts of the application 605 within the system which are needed to perform various functions and tasks including and not limited to dialog managers, function managers, task managers, tasks, AI, ASR, Natural Language Understanding (NLU), Text to Speech (TTS), Natural Language Generation (NLG), Machine Learning (ML), recorded audio, text, images, hand gestures, image recognition, etc.

For example, entry of a reservation "from" date, a reservation "to" date, a hotel property, number of rooms, number of guests, payment and reward information, or other properties need not be programmed into the system, but could be understood through Workflow-Script Analysis decomposition 410 and analysis of data entry forms (data entered by the agent) 420, and then automated by matching the tasks and task organization to existing application frameworks 450 for reservations. Using the best fit method, the framework with the script is matched, and in turn is used by advanced dialog 600 to produce a reservation dialog, which in turn could be manually tested, or tested by running actual "conversations" from the data lake 150 through the system and comparing HI results to AI results data.

An application 605 which executes within the system can comprise one or more dialog managers 610, each dialog manager managing a major function of the system. For example, the application for hotels—which can contain major functions of reservations, rewards, concierge services, housekeeping, as some non-limiting examples—could have dialog managers 610 to manage each major function. Each of these functions in turn could have function managers 620, which focus on the function of reservations, for example. The function managers 620 in turn could have one or more task managers 630, such as hotel look-up. The task manager could likewise have one or more manager tasks 640 that it manages, such as city look-up, property look-up, or property selection.

A reservation may be decomposed into tasks 640, such as entry of reservation dates, searching for a hotel location or a flight, or booking a seat or a room, as examples of some tasks and of their task sequencing. These tasks are organized by the task manager 630 as multiple functional steps associated with a reservation.

The system reservations application framework 450 can be used for various industries, such as plane reservations, hotel reservations, cruise reservations, and car reservations, as some non-limiting examples. The framework gives the advanced dialog 600 executable structure, where the task decomposition gives the advanced dialog the data (including forms to fill) to complete the service interaction.

Advantageously, this method of structuring a system can significantly reduce the need for programming and testing dialogs, though companies may of course still augment the default frameworks, configure the frameworks, and adjust the dialogs where needed. This is due to the fact that most changes are data changes and not code additions. As a result, only verification of configuration of the data need be performed, not execution of the system, which is predefined in the application frameworks.

Well-defined, reviewed, and approved company agent scripts with data entry forms thus serve as input to the dialog system, with text-to-speech 107 enabling the generating of audio for the consumer as needed. This eliminates tedious legal review of a new dialog to define what consumers may hear or view. In some cases, skilled human supervision, adjustments, legal review, recording of audio, testing and validation may additionally be employed before live production.

Turning to the distributor 500, when the system requires using an understanding service 550, it matches system resources with dialog requirements using a multidimensional matrix representing dialog requirements 510 (e.g., types of consumer characteristics, security requirements, tasks to be performed, tasks cost model) with the resources of capabilities/availability data 520 to assign the service to HI or AI, optionally using an acceptable configurable back off vector indicating a maximum degree of allowable deviation from the specified requirements. For example, a consumer characteristic with a value of 9 (e.g., representing an easily frustrated consumer) would be best matched with an agent with a corresponding characteristic with value of 9 (e.g., indicating that the agent has a calming disposition that is soothing to frustrated customers). Specifying a backoff limit of 5 would mean that the distributor 500 will first attempt to match the consumer with the closest agents with characteristic values in the range from 9 to 5, only placing the consumer into a queue if an agent matching that criterion is not presently available.

The capabilities of the resources of the system can be adjusted in real time, as the AI learns more transactions. The distributor 500 periodically polls (polling period is configurable) the APIs 523, 526, 529, and accordingly adjusts agent services, capabilities, and availability. System services can be adjusted through configuration from: Artificial Intelligence (AI), to a mixture of AI and Human Intelligence (HI), to full HI. At all times, the distributor 500 has up-to-date information about its workforce and its capability, which includes both automated dialogs 600, understanding services 550, as well as AI 800 and HI 900. Statistics are constantly kept about the availability and capability of the workforce in order to maximize both AI and HI services.

In some embodiments, dialog requirements matching resources of capability/availability 520 are described in a priority order, using customer profile matching as the first priority to match, with each of the profile characteristics being represented as an ordered pair, where one element of the pair is the desired value of the characteristic to match, and the other element is the "back-off matching threshold". For example, the consumer profile 170 may specify a value of 5 for a particular characteristic of the consumer, and the configuration of the distributor 500 may have values of 5 and 2 for that characteristic, meaning that the consumer should preferably be matched with an agent that has a profile of 5, and no lower than a value of 2.

Security has become an important aspect of any system. This system configures a vector of security to HI services to define capabilities and methods of processing or redacting special information from agents. For example, some agents maybe trained in HIPPA, a value of 6, where security clearance to process credit card information may have a value of 8. Agents that are long term employees who can perform all sorts of conversations, may have a clearance of 9, and their managers a value of 10.

The distributor 500 matches consumers to automated components to handle interactions with the consumer, based on the characteristics of the consumer and the area of interest. This distribution method has been extended to include not only voice call services, but also to include multiple channels (voice, chat, text, social, web, audio visual, etc.). The system not only combines these "channels" of communication, but also understands multimodality and audiovisual elements, which modern consumer devices are capable of supporting. In some embodiments, the distributor 500 is trained using machine learning techniques to choose the best component for a given consumer. As the system learns successful approaches to performing a function (as indicated by corresponding confidence scores), whether automated or by agent, characteristic of the consumer, capability of the agent, their quality as measured by results, or methods of automation, these successful features will be given higher weighting and the distributor will use this information to assign work appropriately.

The distributor 500 works closely with the proxy 145. When the proxy 145 identifies a lower than desirable AI understanding threshold 840, the distributor 500 finds an available agent/intent analyst 950 to perform the understanding service 550. If no agent is available, the proxy 145 can decide to backoff the threshold criteria to a lower threshold of understanding or to put the request on "hold" until there is a suitable agent available. Whether the system employs a live agent or an automated system for communication with a consumer is opaque to the consumer, as seen in the simplified FIG. 2.

The proxy 145 uses recognition criteria—such as consumer conversation history, consumer characteristics, AI success of each turn of the current conversation (as stored in a dialog state 695) and conversation to date—to update dialog requirements for using AI or HI Understanding Services 550. The decision of the proxy 145 is independent of the distributor 500, the major responsibility of which is to match requirements and decide on resource availability to route the conversation.

The advanced dialog 600, the workflow-script analysis 400, and the machine learning 300, may use information from external sources to build the dialog. For an example, a food menu with agent "scripts" can be used to build a knowledge graph of items, and the menu data, with agent conversation, agent scripts and transcriptions of conversations, can be used to match an application of the application framework 450 to order food. The knowledge graph dialog is described in U.S. patent application Ser. No. 16/265,668. The food menu and business rules can be augmented by the company 185. The knowledge graph gives a dialog manager an organization and method regarding what can be ordered and how to select choices, where the agent scripts give the workflow-script analysis 150A the types of "prompts" associated with order, the many consumer conversations provide data for the AI models (e.g., transcribed words, associated sounds, entities and intents from transcriptions).

Figure 1:
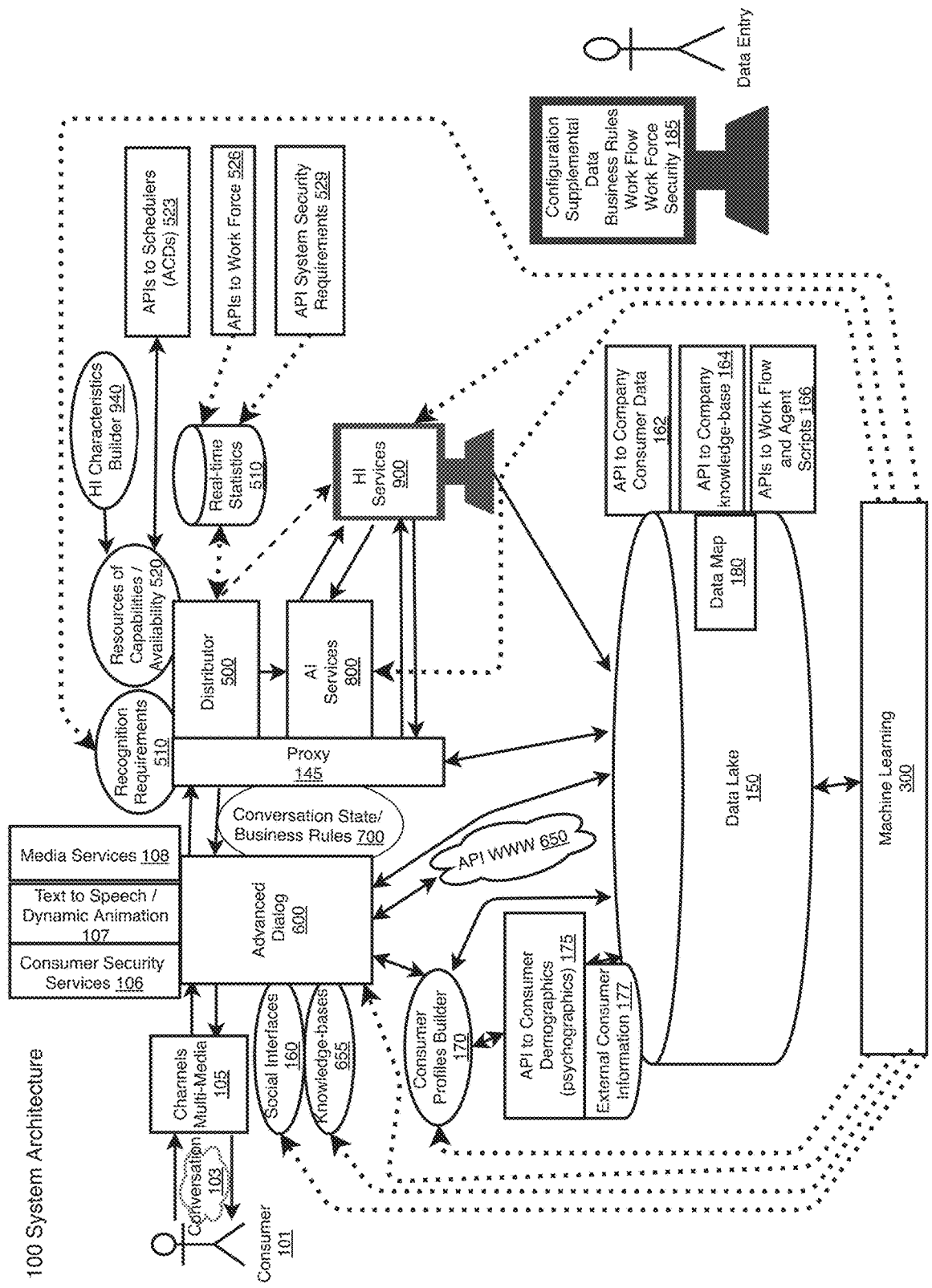
FIG. 1 is a system architecture that depicts the major functions within a comprehensive virtual assistant for consumer-to-company solutions, according to some embodiments.

Other application frameworks 450 may be used by the advanced dialog 600, such as a workflow-based approach, where the decomposition of the company work flow 420 into tasks gives the machine learning a method of matching tasks to the dialog components 457, and the sequence of these tasks provides a method of data organization to traverse a conversation. In some embodiments, the workflow-based approach is combined with a propose-decide-based advanced dialog 600. An advanced dialog 600 based on a propose-decide framework can be represented as a set (pool, or a hierarchy), of dialog components, each with a specific domain knowledge and set of business rules, and a specific set of goals to accomplish. In an embodiment employing hierarchies, each level of the hierarchy has knowledge of the levels below and relies on the expertise of the levels below for their ability to perform tasks. If AI understanding at a task 640 doesn't understand what the consumer wants (i.e., the confidence score of the AI's interpretation is below a given threshold), it elevates the part of the conversation to the dialog component "above" in the hierarchy. For example, referring to FIG. 6, the task 640 would elevate a given part of the conversation to task manager 630, and the task manager 630 would elevate to the function manager 620. Thus, the AI conversation processing proceeds from the specific to the general, as necessary. The APIs to workforce 526 (see FIG. 1) allow getting a list of those virtual "agents" (dialog components) with their "capabilities". In some embodiments, hierarchies are pre-defined but customizable by different customers.

As noted, capabilities can be hierarchical; for example, the reservation capability of a function manager 620 could be assigned to an agent who can enter a complete hotel reservation. A subtask, such as locating a property, may be assigned to an agent just starting who is assigned a capability of task 640 (e.g., "hotel lookup", where all the agent is trained to do is to find a hotel). These capabilities when learned by the system can be assigned to automated tasks.

Industry-Specific Examples

The following provides a specific example for the hotel industry, according to some embodiments.

An example of how the system maybe initialized by the customer: The customer may choose to enter all information into the system manually, by the data entry person, 185. They may select a sample template of their industry, from a GUI listing industry types, e.g. Hospitality, and framework dialogs to configure (reservations, rewards, billing, etc.). Customer specific information may be added, such as company name, and data could be loaded, like hotel properties and their name and organization. Data entry can be used to specify data names and descriptions that are familiar to the company, and descriptions, overriding the existing defaults. The system could then start to play an automated dialog where the data entry person could adjust rules (e.g. for reservations, such as the rule: if the hotel is 100% booked and the user is an elite member of rewards, then book their reservation, allowing a reservation to lapse for the latest arrival, booking to a nearby property). The default forms from the template would show the required fields for entry by the user, where data entry could add or delete fields within the forms. The form field ordering may dynamically change by specification. For example, a hotel booking may order the fields as property, then day, then number of nights. Data entry could change the order to day, then number of nights, and on another form facilitate a property search to select a hotel.

For cruises, the conversation may start with a destination, optionally selecting a ship, then dates. The system is flexibly configurable and can run in a trial and QA mode dynamically as changes are made.

In addition to data entry, the system can consume existing forms, data names, and descriptions electronically, even decomposition company work flows, such as: the first step is identification of the user; step two is establishing the user account; step three and so forth are tasks which are ordered by the customer's system.

An application for the hotel industry, in the system, may consist of the following major functions.

The structure of customer conversations in the hotel industry could be arranged as follows:

Main Menu:
  Reservations
    Hotel Look-up
      Country, city/state, area
    Booking
      Hotel #, date, who, number of nights, payment type*,
    Payment
      *Type: Profile, credit card, rewards, other
      Card #, expiry, security, zip
  Rewards
    Reward look-up, ani, email, reward number, phone number, etc.
    Reward entry name and address, family, etc.

Property Management
  Housekeeping
  Restaurant management
  Etc.
  Concierge Services For the purpose of the use case we will focus on Reservations and Rewards.

Note from the above information and associated "agent" scripts from the customer, the workflow information can be consumed from the API 166. Analyzing the agent scripts and the associated screens 410, and the data map 180—which maps customer-specific names like "bonjour number" to the generic system name "reward number"—the data entry screens, hotel look-up, booking, and payment, can be analyzed into discrete tasks 420 with the associated scripts used by the agent. An application framework for hospitality, which would be defined into the system, which may have 2 or three frameworks depending on the "property characteristics", would have an existing hotel reservation framework, with dialog managers and components. The organization flow of the customer system may not be defined in the system. That is, there may be no relationship in the software of the flow of control of the company system, but the agent performs the flow of control because they are trained in the company system. The flow of control could also be discovered from the logging of the transactions, date and time of data entry, into the database, for example in the use case below, the log is look-up of ANI (caller ID), no match, identify user, hotel search, etc. Analyzing the log information of company system, enables the workflow analysis to decompose the customer system into tasks, and then match these tasks to the template, which is organized in the system. This is all done prior to runtime, and can be updated with new workflows from the customer system. Business rules 700 may not be available at time of workflow script analysis 400, and may require data entry by 185, default rules are established in the frameworks.

During execution, the new system has the execution flow and business rules in the advanced dialog 600. The definition of the application and the advanced dialog is in the framework provided in the system 450. Execution happens upon events such as the arrival of an email, the posting of a social post, the receipt of a phone call, etc. With identification of the consumer or user, the event themselves, use the state information 695 to either start the dialog or to pick up from previous state. State preservation can be company-defined. For example, a reservation conversation that is partially completed may be open for 1 week, unless the date of the reservation is past.

Principles similar to those for Web, Mobile, and Text apply to voice calls when calling a hotel 800 number.

The main number may respond to the inquiry with a prompt such as, "Welcome to <hotel name>. How can I help you?" This part of the dialog would be in a function call greeting. The desktop of the agent would have a script with a variety of system screens and data entry tasks. The following identifies the system screens and possible logic for one example in the hotel industry:

```
System: "Welcome to <name> hotel."
    [[System phone look-up <result not found>]]
    System: "How can I help you?"
Customer: I would like to book a room in Chicago, Thursday night.
    [[The system displays a Reservation user interface to an agent.]]
    System: "Are you an existing customer or a new customer?"
Customer: Existing.
    [[The system displays a user identification user interface to the agent.]]
    System: "Can you please provide me with a phone number, reward number, or
    name and address?"
Customer: My phone number is 555-555-5555, but also please add my work
number to my profile.
    [[System look up successful]]
    System: "Please wait while I update your profile."
        [[The system displays a user profile user interface to the agent; the
        agent enters updates the user profile, then transitions to a hotel
        lookup user interface and enters "Chicago" for the city, resulting in
        four hotels within Chicago being identified to the agent.]]
    System: "We have four hotels in Chicago. What area were you looking to stay
    in?"
Customer: Near downtown.
    System: "Great, I found the Chicago Suites Hotel. How many nights, and for
    how many people?"
Customer: One night. Just me.
    [[The agent now goes into the reservation booking user interface and
    enters the date and the number of nights. The system enters the type of room,
    payment information, etc.]]
    System: "You're all set. Your reservation number is xxxxxxx. You are confirmed
    for one night at the Chicago Suites Hotel. Is there anything more that I can do
    for you today?"
Customer: All set, thank you. Good bye.
    <Hangs up>
```

OTHER CONSIDERATIONS

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A computer-implemented method comprising:
    training dialog components to interpret user utterances based on training data including utterance data obtained from at least one of human intelligence (HI) or artificial intelligence (AI), wherein training the dialog components comprises:
    for a first task corresponding to a dialog component:
    for prior stored conversations, comparing results obtained by a first task model corresponding to the first task with stored results obtained from human agents who previously handled the conversations, and
    responsive to the comparison indicating sufficient confidence in the first task model, adding the dialog component to a set of dialog components eligible for runtime use;
    establishing a conversation between a user and a virtual assistant such that the virtual assistant manages the conversation, the conversation having corresponding dialog data including a state of the conversation;
    identifying a task within the conversation, the task being associated with one or more of the trained dialog components and having a corresponding task model;
    determining, based on a confidence score from application of the task model for the task being below a threshold, that the virtual assistant is unable to complete the task;
    responsive to determining that the virtual assistant is unable to complete the task, assigning the task to a human agent for completion in an asynchronous manner, without the virtual assistant transferring control of the conversation to the human agent, such that the virtual assistant interprets a next task of the user in the conversation while the human agent is interpreting the task;

the virtual assistant receiving a result of the task from the human agent; and the virtual assistant using the result of the task to respond to the user in the conversation.

2. The computer-implemented method of claim 1, wherein the virtual assistant continues with the conversation while waiting to receive a result of completion of the task by the human intelligence.

3. The computer-implemented method of claim 2, wherein the human intelligence is a human agent, the computer-implemented method further comprising:

the virtual assistant joining the human agent into the conversation, such that the user directs conversation to the human agent;

the virtual assistant interpreting an utterance of the user as a second task to be performed; and the virtual assistant assigning the second task to human intelligence or artificial intelligence for completion.

4. The computer-implemented method of claim 1, wherein the virtual assistant manages the conversation while waiting to receive a result of completion of the task by the human intelligence.

5. The computer-implemented method of claim 4, wherein the human intelligence is a human agent, the computer-implemented method further comprising:

the virtual assistant joining the human agent into the conversation, such that the user directs conversation to the human agent;

the virtual assistant interpreting an utterance of the user as a second task to be performed; and the virtual assistant assigning the second task to human intelligence or artificial intelligence for completion.

6. The computer-implemented method of claim 1, wherein the human intelligence is a human agent, the computer-implemented method further comprising:

the virtual assistant joining the human agent into the conversation, such that the user directs conversation to the human agent;

the virtual assistant interpreting an utterance of the user in the conversation; and the virtual assistant assisting the human agent by providing data to display within an agent desktop user interface of the human agent, based on the interpreting.

7. The computer-implemented method of claim 1, wherein each trained dialog component has a corresponding task model.

8. The computer-implemented method of claim 1, wherein assigning the task to a human agent is additionally responsive to a current queue length for agents.

9. The computer-implemented method of claim 1, wherein assigning the task to a human agent comprises matching dialog requirements with characteristics of candidate human agents.

10. The computer-implemented method of claim 1, further providing comprising providing the human agent with a graphical user interface allowing the human agent to specify an intent for an utterance in the conversation.

11. A computer system comprising:

a computer processor; and a computer-readable storage medium storing instructions that when executed by a processor perform actions comprising:

training dialog components to interpret user utterances based on training data including utterance data obtained from at least one of human intelligence (HI) or artificial intelligence (AI), wherein training the dialog components comprises:

for a first task corresponding to a dialog component:

for prior stored conversations, comparing results obtained by a first task model corresponding to the first task with stored results obtained from human agents who previously handled the conversations, and responsive to the comparison indicating sufficient confidence in the first task model, adding the dialog component to a set of dialog components eligible for runtime use;

establishing a conversation between a user and a virtual assistant such that the virtual assistant manages the conversation, the conversation having corresponding dialog data including a state of the conversation;

identifying a task within the conversation, the task being associated with one or more of the trained dialog components and having a corresponding task model;

determining, based on a confidence score from application of the task model for the task being below a threshold, that the virtual assistant is unable to complete the task;

responsive to determining that the virtual assistant is unable to complete the task, assigning the task to a human agent for completion in an asynchronous manner, without the virtual assistant transferring control of the conversation to the human agent, such that the virtual assistant interprets a next task of the user in the conversation while the human agent is interpreting the task;

the virtual assistant receiving a result of the task from the human agent; and the virtual assistant using the result of the task to respond to the user in the conversation.

12. The computer system of claim 11, wherein the virtual assistant continues with the conversation while waiting to receive a result of completion of the task by the human intelligence.

13. The computer system of claim 12, wherein the human intelligence is a human agent, the actions further comprising:

the virtual assistant joining the human agent into the conversation, such that the user directs conversation to the human agent;

the virtual assistant interpreting an utterance of the user as a second task to be performed; and the virtual assistant assigning the second task to human intelligence or artificial intelligence for completion.

14. The computer system of claim 11, wherein the virtual assistant manages the conversation while waiting to receive a result of completion of the task by the human intelligence.

15. The computer system of claim 11, wherein the human intelligence is a human agent, the actions further comprising:

the virtual assistant joining the human agent into the conversation, such that the user directs conversation to the human agent;

the virtual assistant interpreting an utterance of the user in the conversation; and the virtual assistant assisting the human agent by providing data to display within an agent desktop user interface of the human agent, based on the interpreting.

16. The computer system of claim 11, wherein each trained dialog component has a corresponding task model.

17. The computer system of claim 11, wherein assigning the task to a human agent is additionally responsive to a current queue length for agents.

18. The computer system of claim 11, wherein assigning the task to a human agent comprises matching dialog requirements with characteristics of candidate human agents.

19. The computer system of claim 11, further providing comprising providing the human agent with a graphical user interface allowing the human agent to specify an intent for an utterance in the conversation.

20. A non-transitory computer-readable storage medium storing instructions that when executed by a processor perform actions comprising:

training dialog components to interpret user utterances based on training data including utterance data obtained from at least one of human intelligence (HI) or artificial intelligence (AI), wherein training the dialog components comprises:

for a first task corresponding to a dialog component:

for prior stored conversations, comparing results obtained by a first task model corresponding to the first task with stored results obtained from human agents who previously handled the conversations, and responsive to the comparison indicating sufficient confidence in the first task model, adding the dialog component to a set of dialog components eligible for runtime use;

establishing a conversation between a user and a virtual assistant such that the virtual assistant manages the conversation, the conversation having corresponding dialog data including a state of the conversation;

identifying a task within the conversation, the task being associated with one or more of the trained dialog components and having a corresponding task model;

determining, based on a confidence score from application of the task model for the task being below a threshold, that the virtual assistant is unable to complete the task;

responsive to determining that the virtual assistant is unable to complete the task, assigning the task to a human agent for completion in an asynchronous manner, without the virtual assistant transferring control of the conversation to the human agent, such that the virtual assistant interprets a next task of the user in the conversation while the human agent is interpreting the task;

the virtual assistant receiving a result of the task from the human agent; and the virtual assistant using the result of the task to respond to the user in the conversation.

\* \* \* \* \*